United States Patent [19]

Lacy

[11] Patent Number: 5,154,477
[45] Date of Patent: Oct. 13, 1992

[54] HEAD SUPPORT FOR VEHICLE SEAT BACKS

[76] Inventor: Jim Lacy, P.O. Box 309, Gladstone, Oreg. 97027

[21] Appl. No.: 682,252

[22] Filed: Apr. 9, 1991

[51] Int. Cl.$^5$ ............................................. A47C 7/38
[52] U.S. Cl. ................................. 297/397; 297/410; 297/DIG. 6
[58] Field of Search ............... 297/397, DIG. 6, 391, 297/410

[56] References Cited

U.S. PATENT DOCUMENTS

| | | | |
|---|---|---|---|
| 3,279,849 | 10/1966 | Radke et al. | 297/284 F |
| 3,608,964 | 9/1971 | Earl | 297/397 |
| 4,097,086 | 6/1978 | Hudson | 297/397 X |
| 4,383,713 | 5/1983 | Roston | 297/397 X |
| 4,862,536 | 9/1989 | Pruit | 297/397 X |
| 5,028,472 | 7/1991 | Gray | 297/219 X |

FOREIGN PATENT DOCUMENTS 2856366  2/1980  Fed. Rep. of Germany ...... 297/397

*Primary Examiner*—Peter R. Brown
*Attorney, Agent, or Firm*—Robert L. Harrington

[57] ABSTRACT

A device including a head support attachable to a vehicle seat. Attachment is achieved by a first fastener applied to the seat back and a second fastener applied to the head support. The head support is provided in the form of a shaped pillow to receive an individual's head providing both frontal and lateral support while sitting in an upright, non-leaning position. The pillow may be adjusted vertically in reference to the seat back to accommodate the requirements of the user.

2 Claims, 2 Drawing Sheets

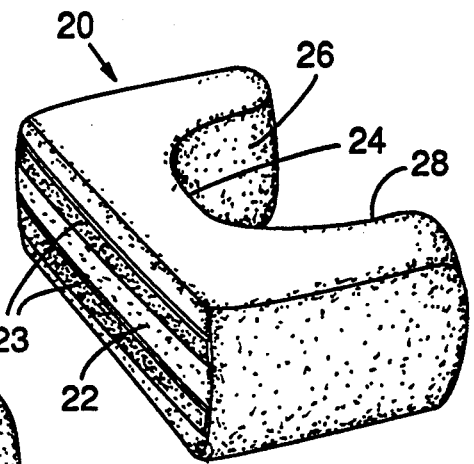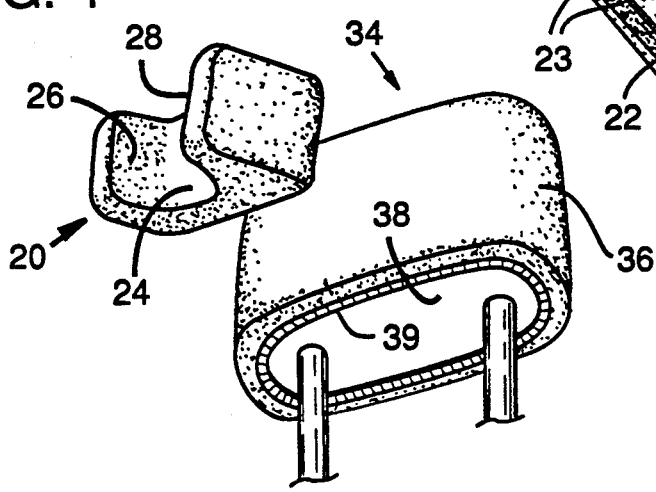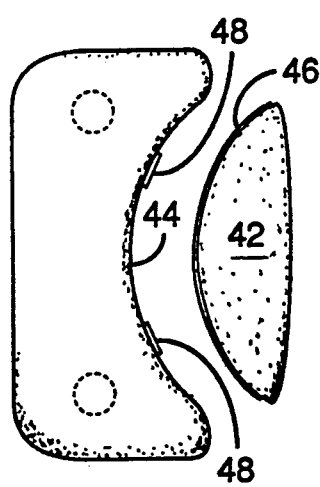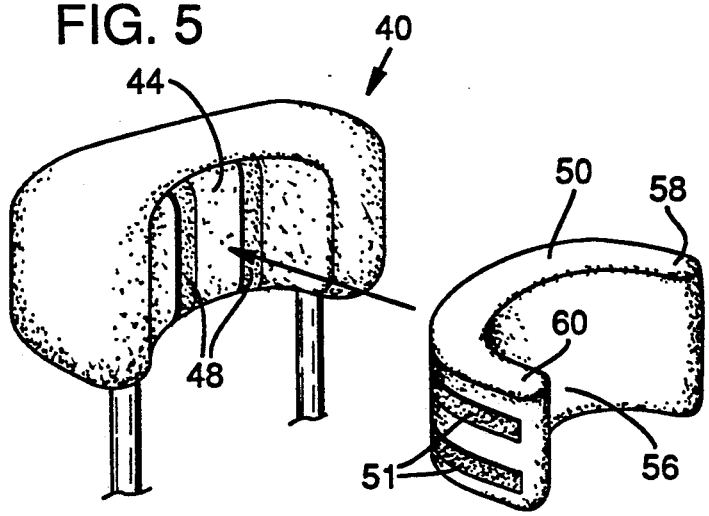

5,154,477

HEAD SUPPORT FOR VEHICLE SEAT BACKS

BACKGROUND INFORMATION

1. Field of the Invention

This invention relates to head supports for vehicle seats and in particular it relates to a formed pillow that is adjustably and removably attachable to a seat back or headrest on a seat back whereby the head is comfortably supported for sleeping in a sitting position.

2. Background of the Invention

Passengers riding in vehicles such as cars, trains, buses and airplanes frequently desire to nap or sleep during a portion of the trip, especially when the trip is of a long duration. One of the problems in trying to nap or sleep while riding in the vehicle is attaining a comfortable position. The trunk of the body is generally well supported by the cushion and back of the seat for comfortable sitting. For sleeping the head needs to be comfortably supported as well which is an objective of the present invention.

Loose pillows have been used to provide support to the head but generally are not satisfactory. The problem with loose pillows is that they cannot be easily placed for optimum comfort and then will not stay in position.

Many of the seats (chairs) of the vehicles are reclinable and have headrests extending upward from the back of the seat. The headrest may be an extension of the back or a separate unit fastened to the back portion of the seat. The intent of the headrest, however, is not to provide comfort to an individual desiring to nap but is provided to reduce the risk of injury to the neck or spine in the event of a collision. These headrests are not in contact with the individual's head during the normal posture assumed when seated in the seat. The head is normally positioned ahead of the rest a few inches so as not to interfere with normal head movement. To engage the headrest the individual thus has to tilt the head back to an unnatural and uncomfortable position. Additionally, the headrests of this type do not provide lateral or side support.

The basic concept of a head support for sleeping is not unique to this invention. Headrests that are adaptable to bring the headrest into contact with the head are disclosed in U.S. Pat. Nos. 4,600,240, Suman et. al. and 3,948,562, Grabner et. al. and 4,682,817, Freber. They require headrest mounting mechanisms that pivot the headrests forward. This mechanism adds undue expense to the headrest construction and also lacks the versatility of adjusting the headrest to the height of the individual. They also do not provide for lateral support of the head. In short, they accomplish the singular benefit of bringing the headrest forward and into contact with the user's head.

U.S. Pat. No. 4,114,948, Perkey discloses an auxiliary formed pillow that is clamped between the top of the seat and the conventional headrest. This device does provide for height adjustment and depends on the special mounting mechanism of the headrest and the seat-headrest design for appropriate clamping of the auxiliary support between the seat top and the headrest.

U.S. Pat. No. 3,578,383, Earl discloses a pillow that will fully support the side of the user's head and is designed to fit onto one side or the other of the seat back. The user leans to the side with his/her head pressed against the side of the headrest. The one-sided pillow needs to be sufficiently wide to provide the necessary support. When alternative support for either side of the user's head is desired, two spaced pillows attached to a base member which in turn requires attachment means to the seat back, is employed.

U.S. Pat. No. 3,574,398, Hargrove and U.S. Pat. No. 4,205,878, Wooten disclose headrests permanently attached to a seat but having side support for the head.

BRIEF DESCRIPTION OF THE INVENTION

The present invention includes an auxiliary portable head support that readily attaches/detaches to a vehicle seat to provide added comfort to an individual seated in a vehicle. The support is a formed pillow that partially wraps around the user's head and is located at the center of the seat for supporting the head in a substantially centered (non-leaning) position in the seat. Minimal side force is applied to the support and it is adequately secured to the seat and readily attached and detached using, e.g. VELCRO type fastening. The seat itself can be covered with appropriate material, or strips of VELCRO can be attached to the seat, or also a slipcover of the desired material or having the Velcro strips can be applied to the seat. In some instances, the conventional headrest can be covered or alternatively designed to have a replaceable insert that will convert the conventional headrest to a head support in accordance with the invention. These and other variations of the invention will be more clearly understood with reference to the drawings and detailed description that follows.

BRIEF DESCRIPTION OF THE DRAWINGS

FIG. 3 is a perspective view of the head support only;

FIG. 4 illustrates a manner of attaching the head support to a conventional headrest; and FIGS. 5 and 6 illustrate an alternate manner of attaching the head support to a headrest.

DESCRIPTION OF THE PREFERRED EMBODIMENT

Figure 1:
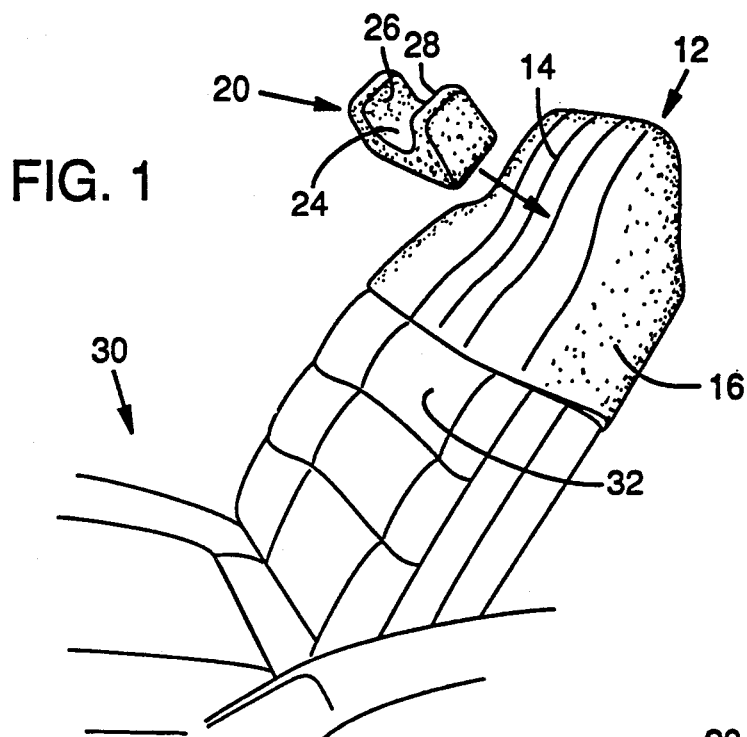
FIG. 1 is a view of a head support of the present invention in the process of being applied to a slipcover provided on a back of a vehicle seat.

Refer now to FIG. 1 of the drawings. It illustrates one embodiment of an adjustable head support 20 fitted to a vehicle seat back 32 of a seat 30. In this embodiment, the head support 20 is attached to a jacket (slipcover) 12 applied to the seat back 32.

The jacket 12 is a form of slipcover that is contoured to the shape of the seat back 32. The seats 30 of different vehicles are not of the same size or shape and, therefore, the jacket 12 is sized according to the seat back 32 to which it is to be fitted. The jacket 12 fitted to the seat back 32 covers the upper area of the seat back. As shown, the front 14 of the jacket 12 extends downwardly a distance sufficient so that a head of a short individual, such as a child, will be adjacent an area of the front 14 of the jacket 12 when the individual is seated in the vehicle seat 30. The front 14 of the jacket 12 is of one material and the back 18 (not shown in FIG. 1) is preferably of an elastic material. The front 14 and back 18 are fastened together as by sewing in a conventional manner. The front 14 is of a material that is comfortable to the touch and has a surface that is matable with a self adhering fastener, e.g., a VELCRO brand self adhering fastener will adhere to it. Such a material is sold under the trademark TEMPO. The material of the front of the jacket 12 perform the function of the female (looped) portion of a self adhering Velcrotype fastener. The back of the jacket 12 being of elastic material is stretched as the jacket 12 is fitted to the seat back 32. The jacket 12 is thus form fit to the seat back 32 and has a defined front 14, side 16 and back 18. The elastic back also holds the jacket 12 in position on the seat back 32.

Figure 2A:
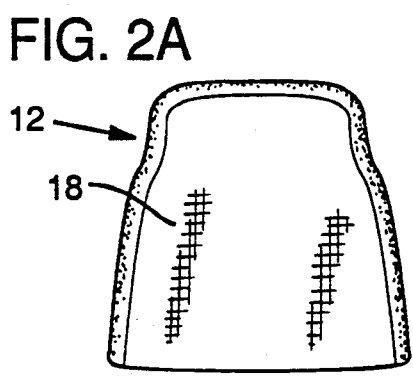
FIGS. 2a, 2b and 2c are views of alternative ways to attach the slipcover to the back of the vehicle seat.
Figure 2C:
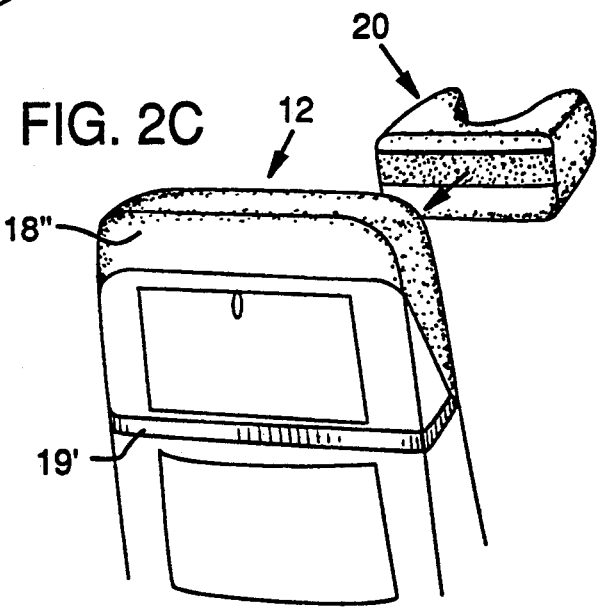
Figure 2B:
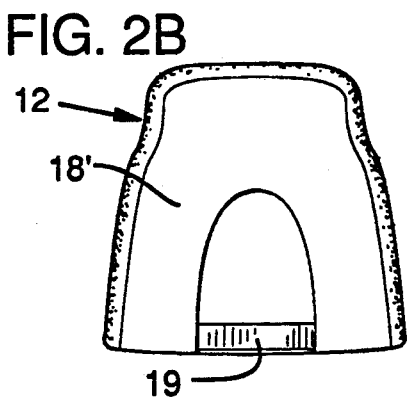

The jacket 12, as stated, is configured to fit the requirement of the seat back and the individual user. For example, FIGS. 2a, 2b and 2c illustrate alternate backs of the jacket 12 to suit the requirements of fitting the jacket 12 to the seat back 32. FIG. 2a illustrates one form of the back of the jacket 12 of FIG. 1, the back being designated by reference 18. Another variation of the jacket 12 is shown in FIG. 2b. The back 18' is suited for seats that have a smooth finish such as vinyl or leather. The auxiliary elastic strap 19 fitted across the bottom of the back 18' aids to hold the jacket 12 in position on a smooth seat. Seats 30, such as in airplanes, that have a tray affixed to the rear of the seat back 32 require a jacket that does not interfere with the function of the tray. The jacket 12 as illustrated in FIG. 2c for this type of seat has a foreshortened back 18". The front 14 may also be foreshortened to the same length or it can be extended as illustrated. The jacket 12 having the extended front is provided with an auxiliary strap 19' that extends from the front 14 around the back of the seat and fits beneath the tray of the seat back.

The pillow 20, further illustrated in FIG. 3, is "U" shaped (in plan view), having a generally flat back 22 and a front 24 that is concave and sized to provide support to a head of an individual. The sides 26 and 28 of the concave front 24 provide lateral support. The pillow 20 is preferably of a molded foam having a yieldable resiliency. The pillow 20 is suitably covered such as with a fabric in a conventional manner. Affixed to the back 22 is a self adhering material 23, such as VELCRO. The material 23 is the hooked (male) portion of the self adhering fastener and will adhere to the material of the front 14 and sides 16 of the jacket 12. The pillow 20 is thus positionable at any position on the surface of the front 14 or the sides 16. The capability of positioning the pillow at any position on the area of the front 14 accommodates individuals of different heights, permits a user to adjust the position of the pillow to any position of comfort and the user may readily change the position by merely pulling the pillow 20 off the front 14 and repositioning. When not in use, the pillow may be stored under the seat, in the glove compartment or in a separate container as it is of a size that is easily stored in a relatively small space.

Many vehicle seats have a head restraint (head rest) separate from but attached to the seat back. The head restraints are often mounted on adjustable support members with the head restraint being adjustable up and down relative to the seat back. The normal profile of the head restraint does not contact the head of an individual seated in the seat unless the individual tilts the head rearward to an uncomfortable position. FIG. 4 illustrates a head restraint 34 of this type that has a cover 36 fitted to the cushion portion 38 of the head restraint. The cover is retained on the cushion by a conventional fastening mechanism such as an elastic band 39 fitted in the peripheral edge of the open end of the cover. The band secures the cover 36 in position on the cushion 38 of the head restraint 34. Snaps or other fasteners such as VELCRO may also be utilized to secure the cover 36 on the cushion 38. The cover 36 is of the same type of material as the front of the jacket 12. The pillow 20 will thus adhere to the cover and hold the pillow in position. The pillow 20 will adjust up and down with the adjustment of the head restraint 34 and may be additionally adjusted by placing the pillow in the appropriate position on the cover 36 that is fitted to the cushion 38.

FIGS. 5 and 6 illustrate a head restraint 40 similar to restraint 34 except that it has a removable insert 42 (FIG. 6). The insert 42 fitting in a formed cutout 44 of the restraint 40 provides the normal profile of the head restraint. The insert 42 is held in position by conventional self adhering fasteners such as VELCRO. A fastener 46 is fitted to the back of the insert 42 and a fastener 48 matable with fastener 46 is fitted to the cutout 44 of the head restraint 40. A pillow 50 (FIG. 5) having a configured back that matches the cutout 44 and having a self adhering fastener 51 fitted to the back is exchangeable with the insert 42. The pillow 50 fitted in the cutout 44 and secured by fasteners 48, 51 provides an extension to the restraint 40 for supporting the head of an individual. The pillow 50 is shaped to have a concave front 56 with sides 58 and 60 of the front providing lateral support to an individuals head. The vertical position of the pillow 50 is adjusted by adjusting the restraint 40 either up or down in a conventional manner. Additionally the pillow 50 may be adjusted vertically on the head restraint 40.

The pillow 50 and insert 42 illustrated in FIGS. 5 and 6 are each illustrated with self adhering fastener strips, such as VELCRO, attached to the back portion. An alternative is to provide the head restraint 40 or the pillow 50 and insert 42 covered with the previously described fastener material, such as TEMPO, that a self adhering fastener (VELCRO) will adhere to. In this way, only a fastener 48 on the head restraint 40 (or on the pillow and insert) need be employed Those skilled in the art will recognize that variations and modifications may be made without departing from the true scope and spirit of the invention. The invention is therefore not to be limited to the embodiments described and illustrated but is to be determined by the claims appended hereto.

What is claimed is:

1. A head rest/pillow device adapted for supporting a head of a passenger while napping the seat of a moving vehicle including bus, train, airplane and automobile said device comprising;

an integral lightweight deformable pillow of compact size for convenient carry on and storage and having front and back sides configured with a concave front side for cradling the head of an individual;

a slipcover removably mounted on a seat back having a head rest attached to the top of the seat back, said slipcover formed of a front panel of soft loop pile material and a rear panel of elastic material, said slipcover adapted to fit over the seat back and head rest and extended downwardly from the head rest on the seat back to a lower position on said seat back intermediate its longitudinal dimension to cover a range of user head positions, first and second matable releasable fasteners, said first fastener being the soft loop pile material of the slipcover and the second fastener being a hook pile material provided on the back side of said pillow, said hook pile material being releasably attachable to said loop pile material at any position between said head rest at the top of the seat back and said lower position, said pillow thereby vertically adjustable relative to a seat back on which said slip cover is mounted between unlimited positions between said head rest and said lower position, said pillow providing cushion support for the back and sides of the user's head and said fasteners mounting the pillow centrally on the seat back and at a selected vertical position to support the user's head with the user comfortably sitting in the seat in a substantially non-leaning, partially reclined, position, and said soft loop pile material being comfortable to the user's head with the pillow removed from the seat back.

2. A head rest/pillow device adapted for supporting the head of a passenger while napping in a sitting position leaning back on the back rest of a seat of a moving vehicle including bus, train, airplane and automobile, said device comprising;

an integral light weight, pillow of compact size and formed from a yieldably resilient material for convenient carry on and storage and said pillow having a U shaped front side for cradling the head of a user with the legs of the U restricting side movement of the user's head and the connecting web having a thickness of the resilient material whereby the front side thereof is projected forward of the back rest to engage and support the user's head in the sitting position;

a slipcover adapted to fit over the back rest of the seat having a front side formed of a soft loop pile material, said loop pile material provided continuously between an upper position at the top of the seat back and a lower position intermediate the seat back's longitudinal dimension and substantially across the entire width on said seat back to cover a range of user head positions, said pillow having a back side formed of a hook pile material that is releasably attachable to said loop pile material is any position between said upper and lower positions, said pillow thereby vertically adjustable relative to a seat back on which said slipcover is provided at unlimited positions between said upper and lower position, said loop pile material on said slipcover and said hook pile material on the back of the pillow mounting the pillow centrally on the seat back and at a selected vertical position to support the user's head with the user comfortably sitting in the seat in a substantially non-leaning, partially reclined, position and said loop pile material having the property of being non-abrasive to a user's touch and thereby comfortable to the user's head and neck with the pillow removed from the seat back.

* * * * *

UNITED STATES PATENT AND TRADEMARK OFFICE
CERTIFICATE OF CORRECTION

PATENT NO. : 5,154,477
DATED : October 13, 1992
INVENTOR(S) : Lacy

It is certified that error appears in the above—identified patent and that said Letters Patent is hereby corrected as shown below:

Column 4, line 47 should read as follows:

head of a passenger while napping in the seat of a moving and

Column 6, line 12, please delete "is" and insert -- at --.

Signed and Sealed this

Twenty-first Day of September, 1993

Attest:

BRUCE LEHMAN

Attesting Officer

Commissioner of Patents and Trademarks